United States Patent [19]

Mauer

[11] Patent Number: 4,913,609
[45] Date of Patent: Apr. 3, 1990

[54] PROFILED BOLT MOUNTING UNIT

[75] Inventor: Dieter Mauer, Lollar, Fed. Rep. of Germany

[73] Assignee: Emhart Industries, Inc., Farmington, Conn.

[21] Appl. No.: 300,146

[22] Filed: Jan. 23, 1989

Related U.S. Application Data

[63] Continuation of Ser. No. 32,411, Mar. 30, 1987, abandoned.

[30] Foreign Application Priority Data

Apr. 2, 1986 [DE]  Fed. Rep. of Germany ....... 3610976

[51] Int. Cl.[4] ............................................ F16B 13/06
[52] U.S. Cl. ......................................... 411/43; 411/45; 411/49; 411/57
[58] Field of Search .................. 411/34–38, 411/43–45, 49, 55, 57, 60, 71

[56] References Cited

U.S. PATENT DOCUMENTS

| 2,756,624 | 7/1956 | Austin | 411/43 |
| 2,959,999 | 11/1960 | Wing | 411/49 |
| 3,204,517 | 9/1965 | Looker | 411/57 |
| 3,279,303 | 10/1966 | Shackelford et al. | 411/49 |
| 3,390,601 | 7/1968 | Summerlin | 411/43 |
| 4,421,137 | 12/1983 | Nusbaumer et al. | 411/49 X |
| 4,437,805 | 3/1984 | Smith | 411/43 X |
| 4,639,175 | 1/1987 | Wollar | 411/43 X |

FOREIGN PATENT DOCUMENTS

| 252210 | 11/1963 | Australia | 411/43 |
| 587088 | 11/1959 | Canada | 411/43 |
| 0179431 | 4/1986 | European Pat. Off. | 411/43 |
| 2606498 | 9/1976 | Fed. Rep. of Germany | 411/45 |
| 1306092 | 9/1962 | France | 411/45 |
| 1377442 | 9/1964 | France | 411/45 |
| 1560445 | 2/1969 | France | 411/49 |
| 1228781 | 4/1971 | United Kingdom | 411/45 |
| 2058266 | 4/1981 | United Kingdom | 411/44 |
| 2060110 | 4/1981 | United Kingdom | 411/38 |
| 2097083 | 10/1982 | United Kingdom | 411/43 |

Primary Examiner—Robert L. Wolfe
Assistant Examiner—Suzanne L. Dino

[57] ABSTRACT

Profiled bolt mounting unit for mounting on a structural member, comprising a blind rivet body having a sleeve and a flange for abutting against the structural member provided for mounting purposes with a mandrel having a setting head and a pull stem which may be gripped by a setting tool and detached from the mandrel at a predetermined breaking point (break neck) after exceeding a certain pulling force. The predetermined breaking point is separated by such a distance from the flange that the portion of the mandrel between the flange and the predetermined breaking point acts as a profiled bolt, whereby the mandrel portion remaining inside the blind rivet body after the setting process projects the profiled bolt portion away from the flange.

2 Claims, 2 Drawing Sheets

PROFILED BOLT MOUNTING UNIT

This is a continuation of co-pending application Ser. No. 032,411, filed on Mar. 30, 1987, now abandoned.

BACKGROUND OF THE INVENTION

The invention is concerned with a profiled bolt mounting unit for mounting on a structural member, comprising a blind rivet body having a sleeve and a flange for abutting against the structural member provided for mounting purposes with a mandrel having a setting head and a pull stem, which may be gripped by a setting tool and detached from the mandrel at a predetermined breaking point after exceeding a certain pulling force.

Such a profiled bolt mounting unit is known from German Gebrauchsmuster 80 00 891. Profiled bolt mounting units are, for example, used to replace a profiled bolt which has not been properly welded on in production or to replace a profiled bolt that has broken off during use. Furthermore, they can be used for mounting profiled bolts at places which are not suitable for conventional profiled weld studs to be welded on. This may arise, for example, when the structural member consists of a steel not suitable for welding, a non-weldable metal, plastics or similar material. On a known profiled bolt mounting unit, the blind rivet body comprising abutting flange and sleeve as well as the profiled bolt portion are designed in one piece. The mandrel is pushed through the sleeve and through the profiled bolt portion, which for this purpose must have a suitable bore, and a predetermined breaking point is provided within the sleeve between the setting head and the stem. This device has the disadvantage, that a bore has to be provided passing through the blind rivet body and the profiled bolt portion to accommodate the mandrel needed for mounting. The manufacture of the blind rivet body consisting of rivetable metal having a through-bore and flange projecting away from the sleeve with adjacent profiled portion is very costly. Moreover, the bore in the profiled bolt portion considerably reduces the strength of the unit, particularly with respect to a bending moment stress. Furthermore, with this mounting unit being designed in one piece, the choice of material for the profiled bolt portion is very limited, since the material has to be selected so that deformation of the sleeve by the setting head is possible.

In DE-OS No. 33 41 266 is described a blind-rivet-like expansion plug for securing a bracket to masonry, on which is provided a grooved stem portion forward of the predetermined breaking point for checking the anchorage after completion of the riveting process. The predetermined breaking point and the grooved stem portion are located before the setting process within the sleeve of the blind rivet and are dimensioned so that the grooved stem portion projects slightly beyond the flange of the blind rivet sleeve after setting so as to allow the supervision of the setting process and an axial interlocking means, which consists of a compression ring presses onto the grooved stem portion. Since the grooved stem portion is entirely within the rivet sleeve, it is not possible to roll this portion after assembly of the expansion plug. In addition, the outside diameter of this portion has to be significantly reduced in relation to the inside diameter of the rivet sleeve in order to permit a satisfactory sliding movement of the portion inside the rivet sleeve. The fixing effect is exclusively attained by clamping the material between the flange of the rivet sleeve and the shank of the rivet sleeve. Significant axial forces and/or bending moments cannot be absorbed by the grooved stem portion.

Furthermore, from DE-PS No. 449 475 is known a hollow-rivet-like fastening element for tightly fastening two panels, on which the hollow rivet, together with a mandrel, is pushed through bores of the panels aligning with one another. The leading end of the mandrel is provided with a cone, which projects slightly from the leading end of the hollow rivet, but with its largest diameter kept smaller than the diameter of the bores. For setting, the hollow rivet a nut is screwed onto a thread of the mandrel at its end opposite the cone, which turns over the respective end face of the hollow rivet, by which the cone drawn into the other side of the hollow rivet also turns over on this side. In this way a flange is produced on both ends of the hollow rivet. The mandrel with nut remains thereby in or on the hollow rivet in order to arrest the mandrel inside the hollow rivet and to ensure the tightness of the assembled panels. This fastening method thus does not relate to a blind rivet having mandrel and predetermined breaking point, so that DE-PS No. 449 475 does not provide any reference to a construction involving a blind rivet.

It is an object of the present invention to provide a profiled bolt mounting unit, which can be easily mounted, simply manufactured and exposed to higher strength.

BRIEF DESCRIPTION OF THE INVENTION

The present invention provides a profiled bolt mounting unit for mounting on a structural member, comprising a blind rivet body having a sleeve and a flange for abutting against the structural member, provided for mounting purposes with a mandrel having a setting head and a pull stem which may be gripped by a setting tool and detached from the mandrel at a predetermined breaking point after exceeding a certain pulling force, wherein a break neck is separated by such a distance from the flange that the portion of the mandrel between the flange and the break neck acts as a profiled bolt, whereby the mandrel remaining inside the blind rivet body after the setting process projects the profiled bolt portion away from the flange.

The mounting unit of the present invention offers the substantial advantage, that a profiled bolt can be mounted in a simple way onto a structural member. A profiled bolt insufficiently or even not at all welded on or a broken-off profiled bolt can be replaced by using a simple riveting process. The use of expensive stud welding equipment for repair purposes is thus rendered superfluous. Furthermore, the profiled bolt of our invention fixed by riveting exhibits advantageous strength properties, since it projects away from the structural member as a solid bolt.

The profiled bolt mounting unit can be manufactured in a simple way. The blind rivet body can be manufactured in known manner. Also the mandrel is easy to manufacture, whereas the profile of the profiled bolt portion can be produced, for example, by rolling after the mounting unit has been assembled. A further substantial advantage is presented in that the material of the blind rivet body and the material of the mandrel may be different, so that the two materials can each be optimally selected with respect to their strength. For instance, the rivet body can be made of a light alloy and the mandrel comprising the profiled bolt portion of steel. Another substantial advantage compared to the prior art is produced in that the profiled bolt portion does not have a bore and hence has a considerably greater strength, particularly with relation to bending moment stresses, than in the prior art. The profiled bolt mounting unit can be mounted anywhere without posing problems, accessibility from one side only being adequate.

If the profiled bolt mounting unit is to be used as a replacement for a broken-off weld stud, it is advantageous that the diameter of the blind rivet body is distinctly larger than the diameter of the profiled bolt portion. When the weld stud breaks off it often leaves behind a hole, whose immediate vicinity is weakened by the marked deformation that occurs when the stud breaks off. If the profiled bolt mounting unit is used to replace such a stud, then the hole left behind has in any case to be drilled out to the diameter of the blind rivet body, so that the weakened areas of the break-off point are removed. In addition, the blind rivet body is supported by resting on the structural member over a wide area which facilitates the absorption of bending moments in particular.

According to a further practical embodiment of the invention, the retention of the mandrel inside the blind rivet body is assisted by providing the mandrel with groove-like recesses running around the stem in the portion of the sleeve of the blind rivet body, into which sleeve material flows during the setting process to axially interlock the mandrel and the sleeve. This configuration is, for example, then of advantage, if fixing elements for the absorbtion of high axial forces are to be pressed onto the profiled bolt portion.

Advantageously, the profiled bolt portion comprises a helical profile in the form of a thread. In this case, a structural member pressed thereon can be removed by unscrewing without subjecting the profiled bolt to high stresses.

In order to prevent the mandrel from rotating in relation to the blind rivet body, the setting head can advantageously be radially distended (swollen). In this case the setting head in the riveted sleeve is held in a fixed position in which a torque acting on the profiled bolt can be absorbed.

BRIEF DESCRIPTION OF THE DRAWINGS

There now follows a detailed description, to be read with reference to the accompanying drawings, of profiled bolt mounting units which are illustrative of the present invention. It is to be understood that the preferred mounting units have been selected for description merely by way of example and not of limitation of the invention.

In the drawings.

DETAILED DESCRIPTION OF THE DRAWINGS AND PREFERRED EMBODIMENTS

Figure 1:
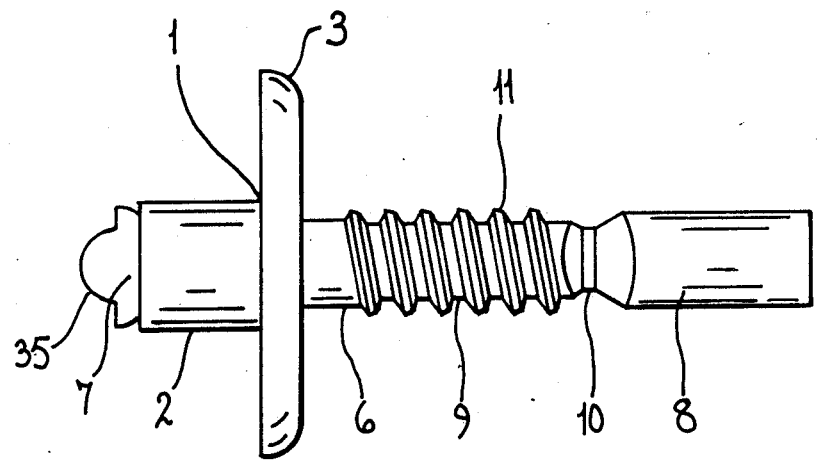
FIG. 1 shows a view of a preferred embodiment of a profiled bolt unit having a thread-like profile.

FIG. 1 shows a first preferred embodiment of a profiled bolt mounting unit in accordance with the invention. The mounting unit consists of a blind rivet body 1, which is formed by a sleeve 2 and by a flange 3. A mandrel 6 which has a setting head 7 at its rear end and a pull stem 8 at the opposite end can be gripped by a setting tool. Between the pull stem 8 and profiled portion 9 is situated a break neck 10, at which the pull stem breaks off during the setting process. Profile 11 of the profiled portion 9 is designed in the form of a helical thread, i.e. so that for example a fixing element provided with a thread can be screwed onto the profiled bolt portion 9. It is, however, also possible to press into place axially a fixing element of plastics without or with a merely slight rotational movement.

Figure 2:
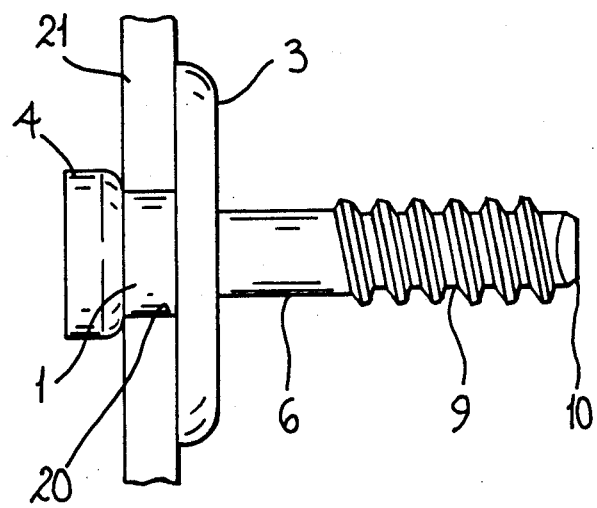
FIG. 2 shows the embodiment of FIG. 1 in the fitted condition.

FIG. 2 shows the embodiment of FIG. 1 in the fitted condition. The profiled bolt mounting unit is fixed in a bore 20 to a structural member 21. The pull stem 8 has been broken off at the break neck 10, so that the profiled bolt portion 9 now projects from structural member 21 like a conventional weld stud. The blind rivet body 1 is held in the bore 20 of the structural member 21 by the abutting flange 3 and by the sleeve deformed into an abutting head 4. The setting head is designed so that it is held in the deformed sleeve of the blind rivet body 1, so that also axial forces in the direction of the structural member 21 can be absorbed by the profiled bolt portion 9.

Figure 3:
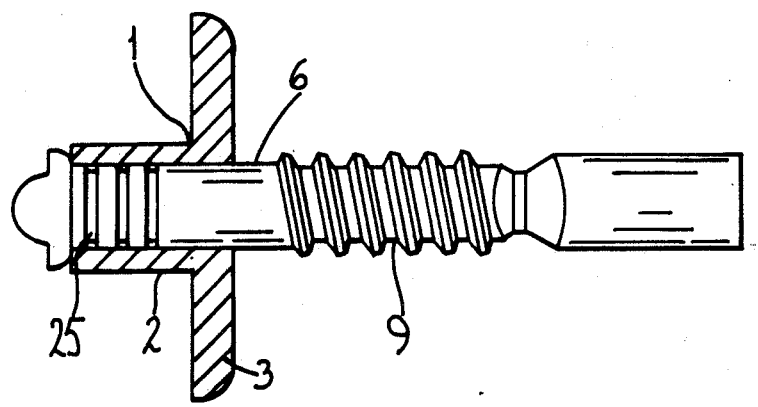
FIG. 3 shows a similar view of a further embodiment of the profiled bolt mounting unit.

FIG. 3 shows a further embodiment of a profiled bolt mounting unit in accordance with the invention. This mounting unit is designed so that the profiled bolt portion 9 is able to absorb particularly high axial forces in a direction towards the structural member. The blind rivet body 1 is designed in the same way as in the preceding exemplary embodiment and therefore the same reference numbers are used. In the area of the sleeve 2 of the blind rivet body 1, the mandrel 6 has groove-like recesses 25 running around the stem. During the setting process, material flows from the inner wall of the blind rivet body 1 into these groove-like recesses, thus producing at this point a positive coupling between the stem of the mandrel 6 and the sleeve 2 of the blind rivet body 1. Because of this design feature, the profiled bolt portion 9 can be subjected to high axial forces such as they may arise, for example, when pressing a fixing element onto the profiled bolt portion.

Figure 4:
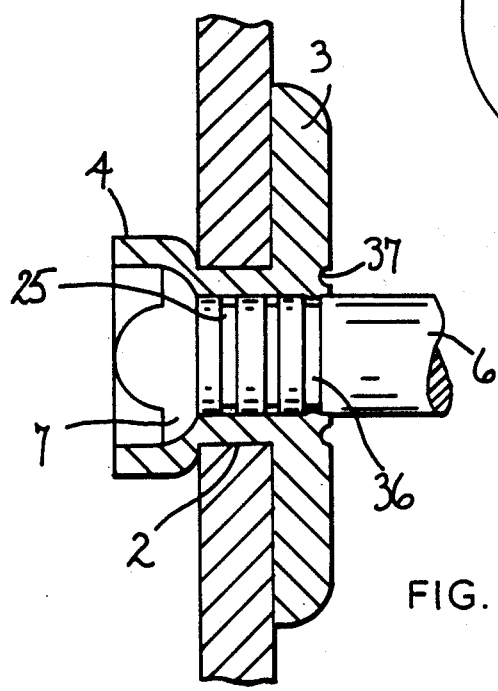
FIG. 4 shows the embodiment of FIG. 3 in the fitted condition.

FIG. 4 shows the embodiment of FIG. 3 in the fitted condition, in which the portion provided with the thread has been omitted for reasons of simplifying the drawing. Otherwise reference should be made to the explanations given concerning FIGS. 2 and 3. It should also be mentioned of FIG. 4, that recess 36 at the end remote from the setting head 7 is partially filled with material of the flange 3, which flow into the recess 36, assisted by the fact that the setting tool is provided with an annular projection at its end facing the flange 3, which leads to the recess 37 impressed into the flange 3, which annularly surrounds the mandrel 6.

Figure 5:
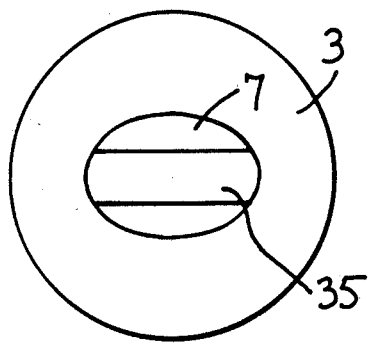
FIG. 5 shows a frontal view of the profiled bolt mounting unit viewed from the setting head end.

FIG. 5 shows a frontal view of the profiled bolt mounting unit of the invention as viewed from the setting head end. The setting head 7 has a annular shoulder 35 (also to be seen in FIG. 1) which, together with the oval cross-section of the setting head 7, ensures that after the setting process the setting head cannot rotate any more in relation to the sleeve.

As FIGS. 1 to 3 show, the profiled bolt portion 9 is of a larger outer diameter than the mandrel 6 in its non-profiled portion. This enlargement of the outer diameter is produced as a result of the manufacturing process used for producing the profile, namely the profiled rollers. By this method the turns of the thread forming the profile 11 are pressed out of the material of the mandrel 6, whereby the core of the thread is produced with only a slight diameter reduction in relation to the diameter of the mandrel 6, at any rate a substantially larger core diameter than if a similar thread had been cut into the mandrel 6. This relatively large core diameter of the thread is particularly desirable for the reason that there is practically no tendency at all within the profiled bolt portion 9 to form an unwanted breaking point in the base of the thread.

What is claimed:

1. A profiled bolt mounting unit for mounting on a structural member which comprises:
    a blind rivet body having a cylindrical sleeve and a flange for abutting against the structural member; and
    a mandrel positioned within the rivet body, said mandrel having a setting head, a plurality of annular groove-like recesses, a profiled portion, breakneck and a pull stem, wherein said setting head has an oval cross-section and annular shoulder and is adapted to be held in place within the deformed rivet body sleeve after the setting operation so that said setting head cannot rotate in relation to said sleeve and so that axial forces in the direction of the structural member are absorbed by the profiled portion; wherein said annular groove-like recesses are positioned adjacent said setting head on that part of the mandrel located within said rivet sleeve and are adapted so that material from the sleeve flows into said recesses during the setting operation to provide an axial interlock between the mandrel and the sleeve; wherein said profiled portion is in the form of a helical thread having an outer diameter larger than the outer diameter of the non-profiled portion of said mandrel which extends outwardly away from said structural member and said flange and which does not contact said flange; wherein said breakneck separates said pull stem from said profiled portion; wherein said pull stem is adapted to be gripped by a setting tool and detached from the profiled portion of the mandrel at a predetermined breaking point after exceeding a certain pulling force during the setting operation; and wherein the mandrel remains inside the deformed rivet sleeve after the setting operation and projects said profiled portion away from said flange;
    wherein said mounting unit is set by a setting tool gripping said pull stem and pulling said stem to deform said sleeve of said rivet body and wherein after setting a fixing element provided with a thread can be screwed onto the profiled portion.

2. The unit of claim 1 wherein the diameter of said rivet body is larger than the diameter of said profiled portion.

* * * * *